United States Patent [19]
Boardman et al.

[11] Patent Number: 5,507,372
[45] Date of Patent: Apr. 16, 1996

[54] TORQUE CONVERTER SLIP RATE-BASED TORQUE CONVERTER LOCK-UP STRATEGY

[75] Inventors: Mark D. Boardman, Portage; Mark A. Osinski, Kalamazoo, both of Mich.

[73] Assignee: Eaton Corporation, Cleveland, Ohio

[21] Appl. No.: 259,092

[22] Filed: Jun. 13, 1994

[51] Int. Cl.⁶ .......................... F16H 45/02; B60K 41/02
[52] U.S. Cl. .......................... 192/3.31; 74/732.1; 477/169
[58] Field of Search ................................ 192/3.31, 3.3; 477/169; 74/732.1, 733.1

[56] References Cited

U.S. PATENT DOCUMENTS

| | | | |
|---|---|---|---|
| 4,449,618 | 5/1984 | Suga et al. | 192/3.31 |
| 4,595,986 | 6/1986 | Daubenspeck et al. | 364/424.1 |
| 4,687,083 | 8/1987 | Sotoyama et al. | 477/169 |
| 4,706,790 | 11/1987 | Lockhart et al. | 477/169 X |
| 4,720,003 | 1/1988 | Murasugi | 477/169 |
| 4,725,951 | 2/1988 | Niikura | 192/3.31 X |
| 4,784,019 | 11/1988 | Morscheck. | |
| 4,860,861 | 8/1989 | Gooch et al. | 192/3.26 |
| 4,957,194 | 9/1990 | Sawa et al.. | |
| 5,010,990 | 4/1991 | Yoshimura et al.. | |
| 5,109,729 | 5/1992 | Boardman. | |
| 5,274,553 | 12/1993 | Boardman | 364/424.1 |
| 5,277,287 | 1/1994 | Ishii et al.. | |

FOREIGN PATENT DOCUMENTS

| | | |
|---|---|---|
| 0493699 | 7/1992 | European Pat. Off.. |
| 0512705 | 11/1992 | European Pat. Off.. |
| 0571275 | 11/1993 | European Pat. Off.. |
| 0578399 | 1/1994 | European Pat. Off.. |

*Primary Examiner*—Rodney H. Bonck
*Attorney, Agent, or Firm*—Howard D. Gordon

[57] ABSTRACT

A torque converter lock-up clutch (26) control is provided which is adaptive to sensed torque demand across the torque converter (20) of a vehicular automated transmission system (12). Torque demand is, in one embodiment, sensed as a function of torque converter slip rate ((ES–IS)/(ES)), and torque converter lock-up is delayed upon sensed positive (ZNV ((ES–IS)/(ES)) torque converter slip rate.

32 Claims, 3 Drawing Sheets

TORQUE CONVERTER SLIP RATE-BASED TORQUE CONVERTER LOCK-UP STRATEGY

BACKGROUND OF THE INVENTION

1. Field of the Invention

The present invention relates to a control system and control method for controlling operation of a torque converter lock-up clutch. In particular, the present invention relates to a control for controlling the torque converter lock-up clutch of an automated vehicular transmission system of the type including an internal combustion engine, a change-gear transmission, a fluid torque converter drivingly interposed between the engine and the transmission, a torque converter lock-up clutch and a control unit.

More particularly, the present invention relates to a control system/method for an automated transmission system of the type described above wherein the torque converter lock-up clutch is adaptively controlled as a function of sensed torque converter slip, transmission input shaft acceleration and/or time since the last change in lock-up status.

2. Description of the Prior Art

Automatic mechanical transmission systems comprising mechanical transmissions and controls and actuators to automatically shift same, usually electronically controlled in accordance with sensed inputs and predetermined logic rules, are known. Examples of such systems may be seen by reference to U.S. Pat. Nos. 4,648,290; 4,595,986; 4,527,447; 4,711,141; 4,792,901; 4,361,060; 5,089,956; 5,157,607; 4,140,031 and 4,081,065, the disclosures of which are incorporated herein by reference.

Fully or partially automated vehicular transmission systems utilizing a fluid torque converter drivingly interposed the engine and the multiple-speed transmission and including a torque converter lock-up and/or bypass clutch also are well known in the prior art. As is well known, at or above certain vehicle speeds, the torque multiplication and damping properties of torque converters are typically not necessary, and it is desirable to lock up the torque converter to minimize the fluid coupling power loss inherent in torque converters. Examples of such automated vehicular transmission systems may be seen by reference to U.S. Pat. Nos. 3,593,596; 4,252,223; 4,271,724; 4,375,171; 4,784,019; 4,860,861; 5,109,729 and 5,274,553, the disclosures of which are incorporated herein by reference. Examples of such systems also may be seen by reference to SAE Paper No. 881830, entitled *The Eaton CEEMAT (Converter-Enhanced Electronically-Managed Automatic Transmission)*, the disclosure of which is incorporated herein by reference.

While the prior art automated vehicular transmission systems equipped with torque converters and torque converter lock-up clutches are widely used and commercially successful, they are not totally satisfactory, especially for use in heavy duty vehicles such as MVMA Class 5 and larger trucks and buses, as the torque converter lock-up clutch locked up at a fixed first transmission input shaft speed and unlocked at a fixed second transmission input shaft speed, which resulted in a lock-up clutch control which was not robust enough for various engine-vehicle combinations, was not adaptive for sensed current vehicle operating conditions (such as load and/or vehicle acceleration/deceleration) and/or under certain conditions, tended to "hunt" (i.e., to undesirably, rapidly cycle between locked up and unlocked conditions).

SUMMARY OF THE INVENTION

In accordance with the present invention, the drawbacks of the prior art are minimized or overcome by the provision, in an automated vehicular transmission system including a fluid torque converter and a torque converter lock-up clutch, of a torque converter lock-up clutch control which adaptively modifies the lock-up point to cause lock-up at a lower input shaft speed under sensed low load conditions and at a higher input shaft speed under sensed higher load conditions, and modifies the lock-up and unlock points to minimize or eliminate the occurrence of lock-up clutch "hunting" and/or to compensate for the reaction times of the clutch actuator by advancing or retarding initiation of lock-up or unlocking operations as a function of sensed vehicle/input shaft acceleration/deceleration.

The foregoing is accomplished by (a) setting the lock-up point at a value equal to a base lock-up value modified by the addition (if positive) of the cumulative sum of (i) a torque slip rate-based offset having a value proportional to torque converter slip rate (if positive), (ii) a lock-up point "anti-hunting" offset having a positive value and being effective for only a given time after an unlock operation, and/or (iii) an acceleration offset having a negative value of a magnitude directly proportional to acceleration of the input shaft; and/or (b) setting the unlock point at a value equal to a base unlock value modified by (i) an unlock point "anti-hunting" offset having a negative value and being effective for only a given time after a lock-up operation, and (ii) a deceleration offset having a positive value directly proportional to the magnitude of deceleration of the input shaft. The base values and one or more of the offsets may be variable with engaged gear ratio.

Accordingly, it is an object of the present invention to provide a new and improved automatic transmission system utilizing a torque converter drivingly interposed the engine and transmission, a torque converter lock-up clutch structure, and an improved torque converter lock-up clutch control system/method.

Another object of the present invention is to provide control logic, based at least in part upon sensed slip and/or slip rate across a torque converter, for controlling torque converter lock-up.

These and other objects and advantages of the present invention will become apparent from a reading of the description of the preferred embodiment taken with the drawings.

DESCRIPTION OF THE PREFERRED EMBODIMENT

Figure 1:
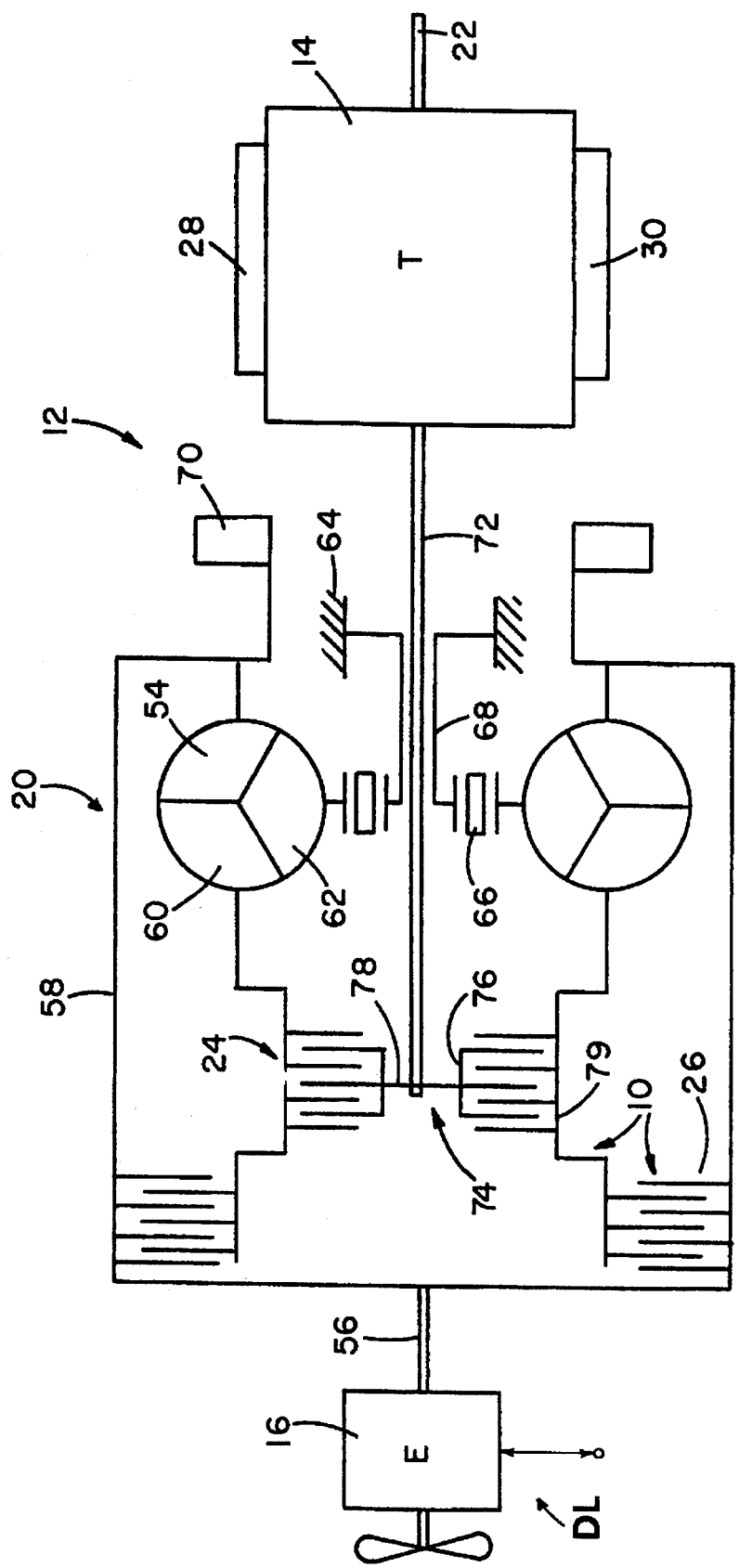
FIG. 1 is a schematic view of an automated vehicular transmission system having a torque converter and torque converter disconnect and lock-up clutch structure particularly well suited for the control method/system of the present invention.

Certain technology will be used in the following description for convenience and reference only and will not be limiting. The words "upwardly," "downwardly," "rightwardly" and "leftwardly" will designate directions in the drawings to which reference is made. The words "inwardly" and "outwardly," respectively, refer to directions toward and away from the geometric center of the device and designated parts thereof. The foregoing applies to the words specifically mentioned above, derivatives thereof and words of similar import.

Figure 2:
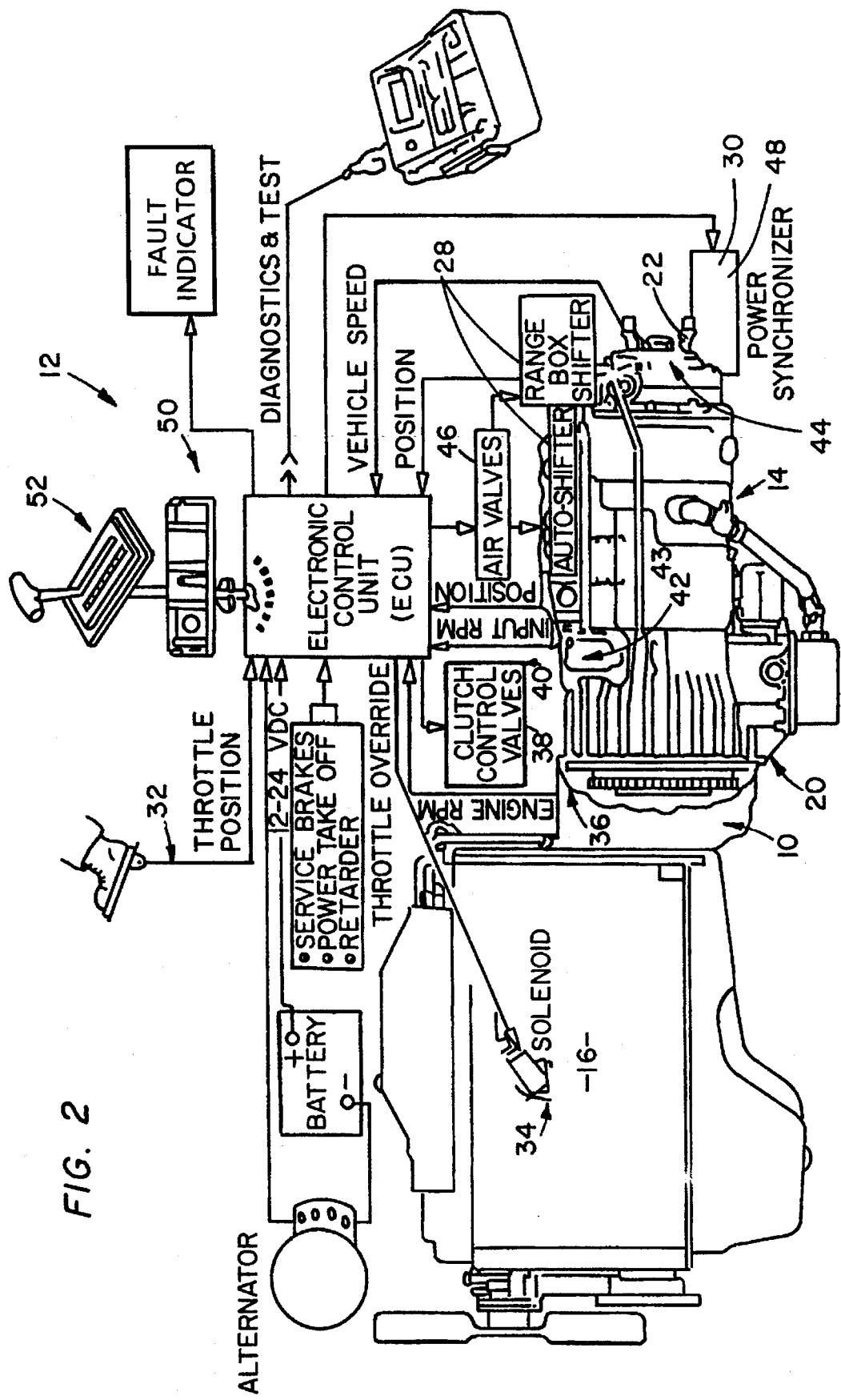
FIG. 2 is a schematic illustration of an automatic mechanical transmission system particularly well suited for the control method/system of the present invention.

The torque converter lock-up and disconnect clutch assembly 10 and an automatic mechanical transmission system 12 utilizing same, both well suited for the control system/method of the present invention, are schematically illustrated in FIGS. 1 and 2. As used herein, the term "automatic transmission system" shall mean a system comprising at least a throttle device-controlled heat engine 16, a multispeed transmission such as a multispeed jaw clutch-type change-gear transmission 14, a non-positive coupling device such as a master friction clutch and/or a fluid coupling 10/20 interposed the engine and the transmission, and a control unit 50 for automatically controlling same. Such systems, of course, also will include sensors and/or actuators for sending input signals to and/or receiving command output signals from the control unit.

Control systems/methods for such automated transmission systems which process input signals according to predetermined logic rules to determine the need/desirability for an upshift or downshift from a currently engaged gear ratio are well known in the prior art. See, for example, aforementioned U.S. Pat. Nos. 4,361,060; 4,527,447 and 4,595,986. Typically, two or more control parameters, such as engine speed, gear ratio, throttle position and/or transmission input/output shaft speed, are utilized to determine if an upshift or downshift from a currently engaged gear ratio is required and/or desirable.

While the present invention is particularly well suited for use in connection with transmission systems having a torque converter and torque converter lock-up/disconnect clutch, the invention is also applicable to transmission systems having a standard torque converter lock-up clutch associated therewith and/or having transmissions utilizing non-positive friction clutches to cause engagement and disengagement of gear ratios. See, for example, U.S. Pat. No. 5,310,033, the disclosure of which is incorporated herein.

The illustrated automatic mechanical transmission system 12 is intended for use on a land vehicle, such as a heavy duty truck, but is not limited to such use. The automatic mechanical transmissionsystem 12 illustrated includes an automatic multi-speed mechanical change gear transmission 14 driven by a prime mover throttle device controlled engine 16 (such as a diesel engine) through a fluid coupling or torque converter assembly 20. The output of the automatic transmission 14 is an output shaft 22 which is adapted for driving connection to an appropriate vehicle component such as the differential of a drive axle, a transfer case, or the like as is well known in the prior art.

The torque converter lock-up and disconnect clutch assembly 10 includes two separate, independently engageable clutches, preferably friction clutches, a torque converter disconnect clutch 24 and a torque converter lock-up or bypass clutch 26. The transmission 14 includes a transmission operating mechanism 28 which is preferably in the format of a pressurized fluid or electric motor actuated shifting assembly of the type disclosed in U.S. Pat. Nos. 4,445,393; 4,873,881 or 4,899,607, the disclosures of which are incorporated herein by reference. The transmission also may include a power synchronizer assembly 30 which may be of the type illustrated and disclosed in U.S. Pat. Nos. 3,478,851, 4,023,443 or 4,614,126, the disclosures of which are incorporated herein by reference.

The present invention is also applicable to automated mechanical transmission systems not including a power synchronizer assembly.

The above-mentioned power train components are acted upon and monitored by several devices, each of which are known in the prior art and will be discussed in greater detail below. These devices may include a throttle position monitor assembly 32, which senses the position of the operator controlled vehicle throttle pedal or other fuel throttling device, a throttlecontrol 34 which controls the supply of fuel to the engine, an engine speed sensor assembly 36 which senses the rotational speed of the engine, a torque converter disconnect clutch and lock-up clutch operator 40 which operates the torque converter disconnect and lock-up clutches, a transmission input shaft speed sensor 42, a transmission output shaft speed sensor 44, a transmission shifting mechanism operator 46 for controlling the operation of transmission shifting mechanism 28 and/or a power synchronizer mechanism actuator 48 for controlling the operation of power synchronizer mechanism 30.

The throttle control 34 may simply be an override device to reduce ("dip") fuel to the engine to a set or variable level regardless of the operator's positioning of the throttle pedal. In the case of control conforming to SAE J1922, J1939 or a similar standard, the fueling of the engine may vary as necessary to obtain and/or maintain a desired engine speed and/or torque.

The above-mentioned devices supply information to and/or accept commands from an electronic central processing unit (ECU) 50. The central processing unit or controller 50 is preferably based on a digital microprocessor, the specific configuration and structure of which form no part of the present invention. The central processing unit 50 also receives information from a shift control or mode selector assembly 52 by which the operator may select a reverse (R), a neutral (N) or several forward drive (D, $D_L$) modes of operation of the vehicle. Typically, the D mode of operation is for on-highway vehicle travel while the $D_L$ mode of operation is for off-road operation.

Typically, the system also includes various sensors, circuits and/or logic routines for sensing and reacting to sensor and/or actuator failures.

As is known, the central processing unit 50 receives inputs from the various sensors and/or operating devices. In addition to these direct inputs, the central processing unit 50 may be provided with circuitry and/or logic for differentiating the input signals to provide calculated signals indicative of the rate of change of the various monitored devices, means to compare the input signals and/or memory means for storing certain input information, such as the direction of the last shift, and means for clearing the memory upon occurrence of predetermined events. Specific circuitry for providing the above-mentioned functions is known in the prior art and an example thereof may be seen by reference to above-mentioned U.S. Pat. Nos. 4,361,060 and 4,595,986 and/or by reference to a technical paper entitled "THE AUTOMATION OF MECHANICAL TRANSMISSIONS" published proceedings of a joint IEEE/SAE conference entitled International Congress 20 on Transportation Electronics, IEEE Catalog Number 84CH1988-5, the disclosure of which is hereby incorporated by reference.

As is well known in the operation/function of electronic control units, especially microprocessor based ECUs, the various logic functions can be performed by discrete hardwired logic units or by a single logic unit operating under different portions or subroutines of the control system logic rules (i.e. the software).

A more detailed schematic illustration of the torque converter 20 and torque converter lock-up and disconnect clutch assembly 10 drivingly interposed engine 16 and automatic change gear transmission 14 maybe seen by reference to FIG. 1. The torque converter assembly 20 is conventional in that it includes a fluid coupling of the torque converter type having an impeller 54 driven by the engine output or crank shaft 56 through a shroud 58, a turbine 60 hydraulically driven by the impeller and a stator or runner 62 which becomes grounded to a housing 64 via a one-way roller clutch 66 carried by a shaft 68 grounded to the housing 64. Shroud 58 also drives a pump 70 for pressurizing the torque converter, lubricating the transmission, selectively pressuring the transmission shifting mechanism 28 and/or power synchronizing mechanism 30 and/or operating the disconnect and bypass clutches 24 and 26. Pump 70 may be of any known structure such as, for example, a well known crescent gear pump.

The transmission 14 includes an input shaft 72 driven by the engine 16 via the torque converter assembly 20 and/or lock-up and disconnect clutch assembly 10. Transmission input shaft 72 carries a connecting member 74 fixed thereto for rotation therewith. Connecting member 74 includes a portion 76 associated with the torque converter disconnect clutch 24 and a second hub portion 78 splined for association with the input shaft. Briefly, as will be described in greater detail below, torque converter disconnect clutch 24 may be engaged or disengaged, independently of engagement or disengagement of lock-up clutch 26, to frictionally engage or disengage a connecting member 79 which is associated with the torque converter turbine 60 and a member of the lock-up clutch 26, to and from the transmission input shaft 72 via portion 76 of connecting member 74. Torque converter lock-up clutch 26 may be frictionally engaged or disengaged, independent of the engagement or disengagement of disconnect clutch 24, to frictionally engage the engine crankshaft 56, and shroud 58 driven thereby, to the connecting member 79.

Engagement of torque converter lock-up clutch 26 will engage the engine crankshaft 56, via shroud 58, directly with the connecting member 79, regardless of the engaged or disengaged condition of torque converter disconnect clutch 24, and thus provides an effective lock-up for locking-up the torque converter 20 and driving transmission 14 directly from the engine 16 if disconnect clutch 24 is engaged. Additionally, at speeds above torque converter lock-up speed, the lock-up clutch 26 need not be engaged and disengaged during shifting as disengagement of clutch 24 disconnects the inertia of connection member 79 from input shaft 72.

If the torque converter bypass clutch or lock-up 26 is disconnected, and the torque converter disconnect clutch 24 is engaged, the transmission 14 will be driven from engine 16 via the torque converter fluid coupling as is well known in the prior art. If the torque converter disconnect clutch 24 is disengaged, regardless of the condition of lock-up clutch 26, the transmission input shaft 72 is drivingly disengaged from any drive torque supplied by the engine or any inertial drag supplied by the torque converter, the engine and clutch 26. Disconnecting of the transmission input shaft 72 from the inertial affects of the engine, clutch 26 and/or torque converter allows the rotational speed of the input shaft 72, and all transmission gearing drivingly connected thereto, to be accelerated or decelerated by the transmission power synchronizer mechanism 30 in a more rapid manner for purposes of more rapidly achieving synchronization during a downshift or upshift of the transmission and also allows the power synchronizer 30 to cause the input shaft 72 to rotate at a rotational speed greater than any governed engine speed.

When the vehicle is at rest with the mode selector in the drive or off-highway drive mode, the disconnect clutch 24 will be engaged and the lock-up clutch 26 disengaged allowing for torque converter start-up with its well known advantages. At above a given input shaft speed, vehicle speed and/or gear ratio, the advantages of torque converter operation are no longer required, and the increased efficiency of a direct drive between the drive engine and transmission is required. Upon these conditions, the torque converter lock-up clutch 26 will be maintained engaged, fixing the torque converter impeller 54 and turbine 60 for joint rotation, and allowing the transmission input shaft 72 to be driven directly from the engine via the torque converter shroud 58 and connecting member 79 when the disconnect clutch 24 is engaged.

Selection of the desired gear ratio and selection of the required engaged or disengaged condition of the torque converter disconnect or lock-up clutches, as well as the issuance of command signals to the various clutch and transmission operators is accomplished by the central processing unit 50 in a manner which is known in the prior art and which may be appreciated in greater detail by reference to above-mentioned U.S. Pat. Nos. 4,361,060 and 4,595,986.

In prior art automated transmission systems utilizing torque converters and torque converter lock-up clutches, the clutches were set to lock up or remain locked up as input shaft speed increased from a value less than to a value greater than a fixed lock-up point, and to unlock or remain unlocked as input shaft speed decreased from a value greater than to a value less than an unlock point. For a typical heavy duty automated mechanical transmission system, the lock-up point was about 1,500–1,600 RPM and the unlock point was about 1,300–1,400 RPM. These values could be variable with engaged gear ratio.

The prior art torque converter lock-up clutch control was not totally satisfactory, as the lock-up points were not adaptively modified to differing torque demands, the lock-up and unlock points were not adaptively modified to compensate for vehicle/input shaft acceleration and deceleration and, under heavy converter loads, lock-up/unlock "hunting" occurred.

Briefly, lock-up "hunting" is a phenomenon in which the torque converter repeatedly locks and unlocks due to input speed transients. This transient can be the result of the loss or gain in input speed, or driveline oscillations caused by the locking or unlocking of the converter.

Figure 3:
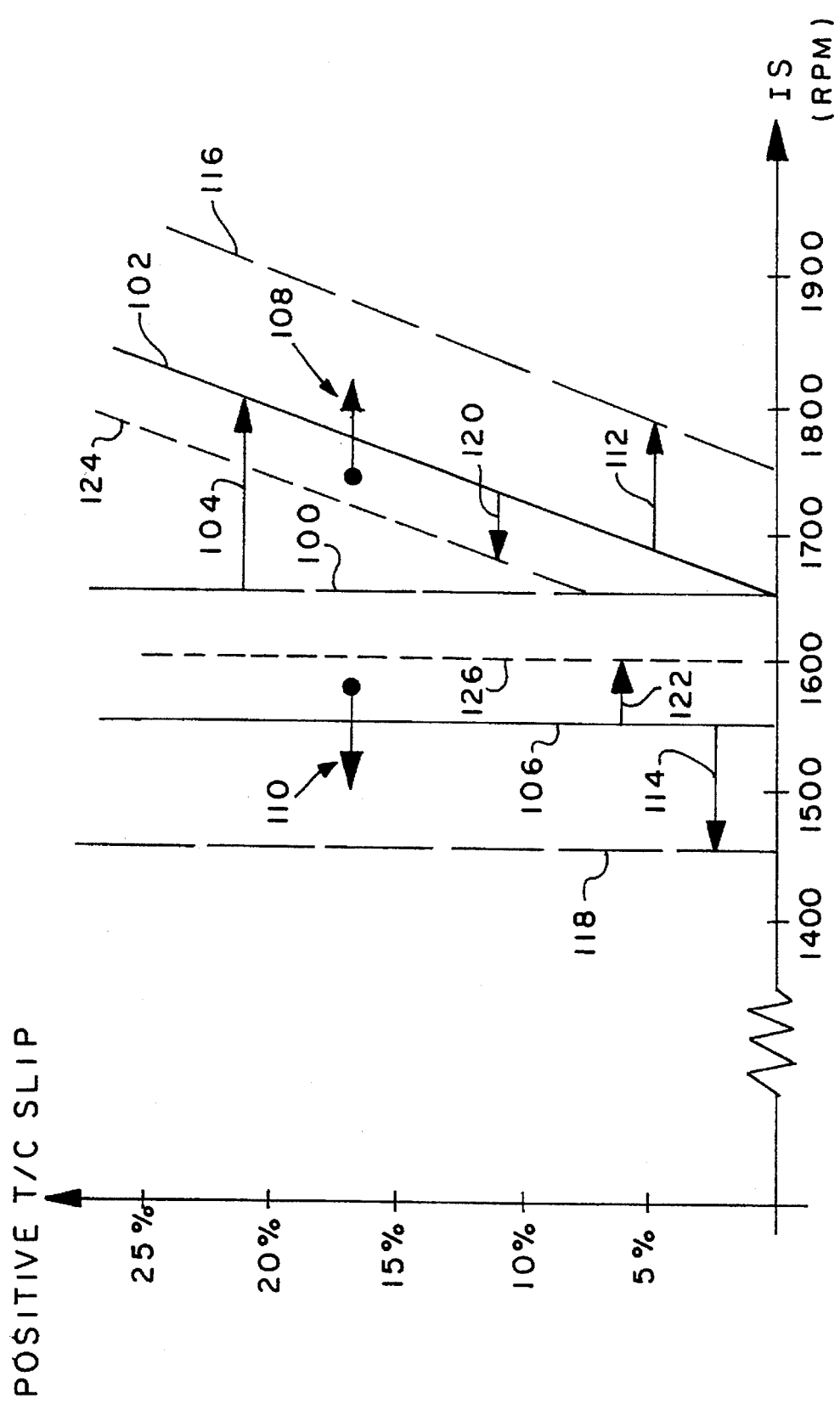
FIG. 3 is a graphical representation of the torque converter lock-up clutch control system/method of the present invention.

The adaptive torque converter lock-up clutch control system/method of the present invention is symbolically represented in FIG. 3. FIG. 3 is a graph of input shaft rotational speed (IS) versus positive torque slip percentage. Torque converter slip is (TC input speed–TC output speed) or (ES–IS). TC slip percentage is ((TC input speed–TC output speed)/(TC input speed)) or (ES–IS)/ES. Positive torque converter slip is (ZNV(ES–IS)) where "ZNV" is a "zero negative value" function where ZNV of X equals X if X is positive and equals zero if X is zero or negative.

In FIG. 3, line 100 is the base lock-up value, line 102 is the base lock-up value plus the torque converter slip rate-based offset, and line 106 is the base unlock value. The slip rate-based offset is indicated by arrow 104.

Briefly, as represented by arrow 108, as the value of input shaft speed increases from a value less than to a value greater than the base lock value plus slip-based offset, represented by line 102, the torque converter lock-up clutch assembly will be commanded to assume or remain in the lock-up condition and, as represented by arrow 110, as the value of input shaft speed decreases from a value greater than to a value less than the base unlock value, represented by line 106, the torque converter lock-up clutch will be commanded to assume or remain in the unlocked condition.

Applicants have found that vehicle performance is enhanced if, under conditions of relatively low torque demand (i.e., a lightly loaded truck or traveling on a level or down a declining surface), torque converter lock-up occurs at a relatively lower input shaft speed, and if, under conditions of relatively high torque demand (i.e., a heavily loaded truck or traveling up an inclining surface), torque converter lock-up occurs at a relatively higher input shaft speed. As positive torque converter slip is directly proportional to torque demand, the lock-up point is made a function of positive torque converter slip, and, thus, is adaptive to changes in torque demand. According to the control system/method of the present invention, as the torque demand increases, slip across the converter increases, and the lock-up point is raised proportionally to extend the time unlocked (to take advantage of the converter longer). Conversely, as the torque converter demand decreases, slip decreases, and the converter lock-up point approaches the base value (resulting in the highest efficiency and lowest heat load). This strategy produces a self-adapting characteristic which "tailors" the torque converter performance to the respective engine, operating condition and driver demand.

To prevent "hunting," a positive "anti-hunt" offset 112 is provided for the lock-up value 102, and a negative "anti-hunt" offset 114 is provided for the unlock value 106. Lines 116 and 118, respectively, represent the lock-up and unlock values, respectively, as modified by the "anti-hunt" offsets. The "anti-hunt" offsets, 112 and 114, are effective for only a predetermined period of time, about 1–2 seconds, after a change in condition in the status of the lock-up clutch. The temporary effect of the "anti-hunt" offsets, 112 and 114, is to minimize the probability of an unlock command immediately after a lock-up command and vice versa.

The reaction time of the torque converter lock-up clutch actuators, often fluid pressure and/or electrically operated, to lock-up and unlock commands from the controller is not instantaneous and, thus, a lead time must be provided to achieve completion of a lock-up or unlock operation at a given time. To prevent overly rapid or overly slow response, the lead time should be adaptively modified for input shaft and/or vehicle acceleration. To achieve that effect, a negative lock-up point acceleration offset 120 and a positive unlock point deceleration offset 122 is provided. If the input shaft is accelerating, the lock-up value 102 is offset to the values of line 124 to cause an earlier command to cause lock-up. The absolute magnitude of acceleration offset 120 varies directly with the value of acceleration of the input shaft and equals zero if the input shaft is decelerating. If the input shaft is decelerating, the unlock value 106 is offset to value 126 to cause an earlier command for unlocking of the lock-up clutch. The absolute magnitude of deceleration offset 122 varies directly with the value of deceleration of the input shaft and equals zero if the input shaft is accelerating.

The current values for the lock-up point and the unlock point may be represented by the following:

Lock-up value=base lock-up value (100)+ZNV (positive slip offset (104)+lock-up anti-hunt offset (112)−acceleration offset (120)); and Unlock value=base unlock value (106)−unlock anti-hunt offset (114)+deceleration offset (122).

As an alternative to basing offset 104 on sensed positive slip rate, a similar offset may be provided based upon a direct reading of engine or driveline torque as may be available from a torque sensor or on an electronic datalink (DL) of the type conforming to the SAE J1922, J1939 or similar protocol.

Accordingly, it may be seen that a torque converter lock-up clutch control strategy, based at least in part upon sensed positive torque converter slip, or upon an input having a value indicative of torque demand, is provided.

It is undertstood that the foregoing description of the preferred embodiment is by way of example only and that various modifications, substitutions and/or rearrangements of the parts are possible without departing from the spirit and scope of the present invention as hereinafter claimed.

We claim:

1. A method for controlling a torque converter lock-up clutch in an automated vehicular transmission system (12) of the type comprising a multiple-speed transmission (14) having an input shaft (72), a fuel-controlled engine (16), a fluid torque converter (20) drivingly interposed between said engine and said transmission, a torque converter lock-up clutch having an unlocked condition wherein relative rotation between the torque converter impeller (54) and the torque converter turbine (60) is not prevented, and a locked up condition wherein relative rotation between the torque converter impeller and the torque converter turbine is prevented, sensors for providing input signals indicative of transmission operating parameters, a central processing unit (ECU) for receiving said input signals and processing same in accordance with predetermined logic rules to issue command output signals and system actuators responsive to said command output signals, including a lock-up clutch actuator effective to cause said lock-up clutch to assume the commanded one of the locked up or unlocked conditions thereof, said control method including determining a value of a lock-up clutch control parameter and comparing that control parameter value to a lock-up value (100, 102) and commanding said lock-up clutch to assume the locked up condition thereof if that control parameter value increases from a value less than the lock-up value to a value greater than the lock-up value, said method characterized by:

setting a base lock-up value (100); and setting said lock-up value as a function of (i) said base lock-up value and (ii) a sensed input signal indicative of engine or transmission torque demand.

2. The method of claim 1 wherein said signal indicative of torque demand is a signal indicative of torque converter slip.

3. The method of claim 2 wherein a positive torque converter slip will cause an increase in said lock-up value.

4. The method of claim 3 wherein said lock-up value is increased by an amount substantially directly proportional to the value of torque converter slip rate.

5. The method of claim 4 wherein said input signals include signals indicative of transmission engaged ratio and the amount of said increase is a function of engaged ratio.

6. The method of claim 1 wherein said signal indicative of torque demand is a signal indicative of torque converter slip rate.

7. The method of claim 6 wherein a negative torque converter slip will not affect said lock-up value.

8. The method of claim 6 wherein a positive torque converter slip will cause an increase in said lock-up value.

9. The method of claim 8 wherein a negative torque converter slip will not affect said lock-up value.

10. The method of claim 8 wherein said lock-up value is increased by an amount substantially directly proportional to the value of torque converter slip rate.

11. The method of claim 10 wherein said lock-up value is increased by an amount substantially directly proportional to the value of torque converter slip rate.

12. The method of claim 10 wherein said input signals include signals indicative of transmission engaged ratio and the amount of said increase is a function of engaged ratio.

13. The method of claim 6 wherein said input signals include signals indicative of engine (ES) and input shaft (IS) rotational speeds and said torque converter slip rate is determined as a function of the relationship ((ES−IS)/(ES)).

14. The method of claim 6 wherein said control parameter has a value indicative of input shaft rotational speed (IS).

15. The method of claim 1 wherein said base lock-up value is selected as the minimum acceptable value of the lock-up value.

16. The method of claim 1 wherein said control parameter has a value indicative of input shaft rotational speed (IS).

17. The method of claim 16 wherein said control parameter has a value indicative of transmission engaged ratio.

18. The method of claim 1 wherein said input signals include signals indicative of transmission engaged ratio and said base lock-up value is a function of engaged ratio.

19. The method of claim 1 wherein said lock-up value is increased by an amount directly related to the value of sensed torque demand.

20. A control system for controlling a torque converter lock-up clutch in an automated vehicular transmission system (12) of the type comprising a multiple-speed transmission (14) having an input shaft (72), a fuel-controlled engine (16), a fluid torque converter (20) drivingly interposed between said engine and said transmission, a torque converter lock-up clutch having an unlocked condition wherein relative rotation between the torque converter impeller (54) and the torque converter turbine (60) is not prevented, and a locked up condition wherein relative rotation between the torque converter impeller and the torque converter turbine is prevented, sensors for providing input signals indicative of transmission operating parameters, a central processing unit (ECU) for receiving said input signals and processing same in accordance with predetermined logic rules to issue command output signals and system actuators responsive to said command output signals, including a lock-up clutch actuator effective to cause said lock-up clutch to assume the commanded one of the locked up or unlocked conditions thereof, said control system including means for determining a value of a lock-up clutch control parameter and comparing that control parameter value to a lock-up value (100, 102) and commanding said lock-up clutch to assume the locked up condition thereof if that control parameter value increases from a value less than the lock-up value to a value greater than the lock-up value, said control system characterized by:

means for setting a base lock-up value (100); and means for setting said lock-up value as a function of (i) said base lock-up value and (ii) a sensed input signal indicative of engine or transmission torque demand.

21. The control system of claim 20 wherein said signal indicative of torque demand is a signal indicative of torque converter slip.

22. The control system of claim 21 wherein a positive torque converter slip will cause an increase in said lock-up value.

23. The control system of claim 22 wherein a negative torque converter slip will not affect said lock-up value.

24. The control system of claim 20 wherein said signal indicative of torque demand is a signal indicative of torque converter slip rate.

25. The control system of claim 24 wherein a positive torque converter slip will cause an increase in said lock-up value.

26. The control system of claim 25 wherein a negative torque converter slip will not affect said lock-up value.

27. A method for controlling a torque converter lock-up clutch in an automated vehicular transmission system (12) of the type comprising a multiple-speed transmission (14) having an input shaft (72), a fuel-controlled engine (16), a fluid torque converter (20) drivingly interposed between said engine and said transmission, a torque converter lock-up clutch having an unlocked condition wherein relative rotation between the torque converter impeller (54) and the torque converter turbine (60) is not prevented, and a locked up condition wherein relative rotation between the torque converter impeller and the torque converter turbine is prevented, sensors for providing input signals indicative of transmission operating parameters, a central processing unit (ECU) for receiving said input signals and processing same in accordance with predetermined logic rules to issue command output signals and system actuators responsive to said command output signals, including a lock-up clutch actuator effective to cause said lock-up clutch to assume the commanded one of the locked up or unlocked conditions thereof, said control method including determining a value of a lock-up clutch control parameter and comparing that control parameter value to a lock-up value (100, 102) and to an unlock value (106) and commanding said lock-up clutch to assume the locked up condition thereof if that control parameter value increases from a value less than the lock-up value to a value greater than the lock-up value, and commanding said lock-up clutch to assume the unlocked condition thereof if that control parameter value decreases from a value greater than the unlock value to a value less than the unlock value, said method characterized by:

setting a base lock-up value (100); and setting the lock-up value at a value equal to a base lock-up value modified by the addition (if positive) of the cumulative sum of (i) a torque slip rate-based offset having a value proportional to torque converter slip rate (if positive), (ii) a lock-up point "anti-hunting" offset having a positive value and being effective for only a given time after an unlock operation, and/or (iii) an acceleration offset having a negative value of a magnitude directly proportional to acceleration of the input shaft.

28. The control method of claim 27 wherein said method is additionally characterized by:

setting a base unlock value (106); and setting the unlock value at a value equal to base unlock value modified by (i) an unlock piont "anti-hunting" offset having a negative value and being effective for only a given time after a lock-up operation, and (ii) a deceleration offset having a positive value directly proportional to the magnitude of deceleration of the input shaft.

29. The method of claim 28 wherein said control parameter has a value indicative of input shaft rotational speed (IS).

30. The method of claim 27 wherein said base lock-up value is a function of engaged transmission ratio.

31. The method of claim 30 wherein said base unlock value is a function of engaged gear ratio.

32. The method of claim 27 wherein said control parameter has a value indicative of input shaft rotational speed (IS).

* * * * *